(12) United States Patent
Higuchi

(10) Patent No.: US 10,890,348 B2
(45) Date of Patent: Jan. 12, 2021

(54) AIR CONDITIONING SYSTEM

(71) Applicant: Mitsubishi Electric Corporation, Tokyo (JP)

(72) Inventor: Teppei Higuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/061,415

(22) PCT Filed: Jun. 17, 2016

(86) PCT No.: PCT/JP2016/068105
§ 371 (c)(1),
(2) Date: Jun. 12, 2018

(87) PCT Pub. No.: WO2017/216956
PCT Pub. Date: Dec. 21, 2017

(65) Prior Publication Data
US 2019/0170386 A1    Jun. 6, 2019

(51) Int. Cl.
*F24F 11/49*     (2018.01)
*F24F 11/64*     (2018.01)
(Continued)

(52) U.S. Cl.
CPC ............ *F24F 11/49* (2018.01); *F24F 1/0003* (2013.01); *F24F 11/30* (2018.01); *F24F 11/56* (2018.01);
(Continued)

(58) Field of Classification Search
CPC .......... F24F 11/49; F24F 11/30; F24F 1/0003; F24F 11/61; F24F 11/64; F24F 11/65;
(Continued)

(56) References Cited

U.S. PATENT DOCUMENTS

| 2009/0236432 A1* | 9/2009 | Malloy | F24F 3/044 |
| | | | 236/49.3 |
| 2009/0259346 A1* | 10/2009 | Reed | G06Q 50/06 |
| | | | 700/295 |
| 2011/0127341 A1* | 6/2011 | Kaneoya | G05D 23/1935 |
| | | | 236/46 A |

FOREIGN PATENT DOCUMENTS

JP     2010-159922 A     7/2010

OTHER PUBLICATIONS

International Search Report of the International Searching Authority dated Sep. 13, 2016 for the corresponding international application No. PCT/JP2016/068105 (and English translation).

* cited by examiner

*Primary Examiner* — James J Lee
*Assistant Examiner* — Shon G Foley
(74) *Attorney, Agent, or Firm* — Posz Law Group, PLC

(57) ABSTRACT

An air conditioning system includes: an air conditioner that includes an outdoor unit including an outside air temperature sensor and an indoor unit including an indoor unit controller to control air conditioning operation and communicable with the outdoor unit; and a remote controller communicable with the indoor unit. The remote controller includes: a schedule storage to store information on an operation schedule of the air conditioner for each date and time, a reference temperature for determining an operation mode of the air conditioner, and an outside air temperature correction value; and an operation mode determiner to select the operation mode from among cooling, blowing, and heating using the information on the operation schedule, a corrected outside air temperature, and the reference temperature. The indoor unit controller controls the air conditioning operation using the reference temperature as a target temperature in the operation mode determined by the operation mode determiner.

8 Claims, 8 Drawing Sheets

(51) Int. Cl.
*F24F 11/65* (2018.01)
*F24F 11/56* (2018.01)
*F24F 11/80* (2018.01)
*F24F 11/30* (2018.01)
*F24F 1/0003* (2019.01)
*F24F 11/61* (2018.01)
*G05B 19/042* (2006.01)
*F24F 110/12* (2018.01)
*F24F 130/00* (2018.01)
*F24F 130/10* (2018.01)
*F24F 110/10* (2018.01)

(52) U.S. Cl.
CPC .............. *F24F 11/61* (2018.01); *F24F 11/64* (2018.01); *F24F 11/65* (2018.01); *F24F 11/80* (2018.01); *G05B 19/042* (2013.01); *F24F 2110/10* (2018.01); *F24F 2110/12* (2018.01); *F24F 2130/00* (2018.01); *F24F 2130/10* (2018.01); *G05B 2219/2614* (2013.01)

(58) Field of Classification Search
CPC ........ F24F 11/56; F24F 11/80; F24F 2130/00; F24F 2130/10; F24F 2110/10; F24F 2110/12; G05B 19/042; G05B 2219/2614
See application file for complete search history.

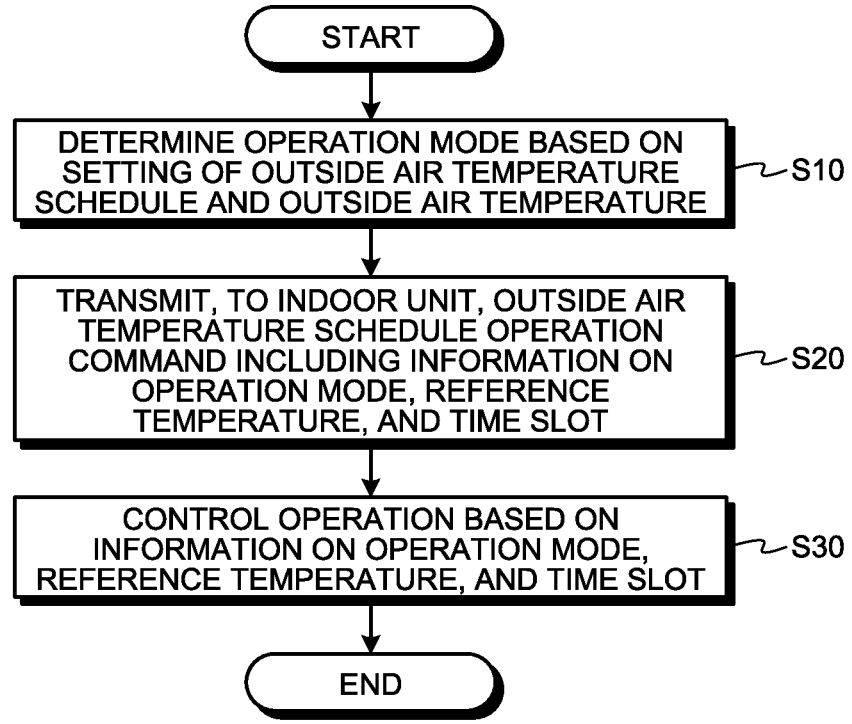
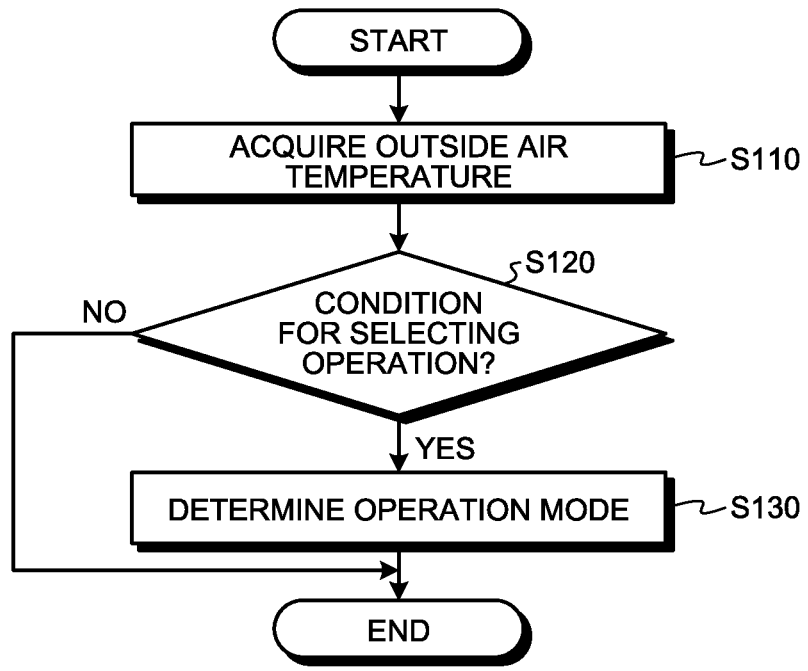

AIR CONDITIONING SYSTEM

CROSS REFERENCE TO RELATED APPLICATION

This application is a U.S. national stage application of PCT/JP2016/068105 filed on Jun. 17, 2016, the contents of which are incorporated herein by reference.

FIELD

The present invention relates to an air conditioning system that operates in accordance with a preset schedule.

BACKGROUND

Patent Literature 1 discloses a conventional air conditioner that has a schedule operation function for controlling operation in accordance with a set temperature schedule indicating the correspondence between set temperature and set time for each day of the week and that controls the operation state according to the set temperature schedule freely set by the user. Hereinafter, a remote controller may be referred to as a remote.

CITATION LIST

Patent Literature

Patent Literature 1: Japanese Patent Application Laid-open No. 2010-159922

SUMMARY

Technical Problem

However, with the schedule operation function of the conventional air conditioner, it is necessary for a user to freely set the set temperature schedule in advance. As the setting items of the set temperature schedule, days of the week and time slots need to be specified. However, under the environment with four seasons, it is expected that comfortable time slots for operation or shutdown are different for summer and winter. Therefore, if the same set temperature schedule is used throughout the year, the user's comfort may be impaired.

In this case, the comfort can be improved if the user resets the set temperature schedule of the schedule operation function. However, the essence of the schedule operation function is not only to perform comfortable operation automatically but also, in one aspect, to reduce the frequency of setting operations by the user. For this reason, the schedule operation function of the conventional air conditioner cannot fulfill its purpose sufficiently in terms of the user's operability.

The present invention has been made in view of the above, and an object thereof is to obtain an air conditioning system that can realize a user's comfort with a smaller number of setting operations.

Solution to Problem

In order to solve the above-mentioned problem and achieve the object, an air conditioning system according to an aspect of the present invention includes: an air conditioner that includes an outdoor unit including an outside air temperature sensor to detect an outside air temperature and an indoor unit including an indoor unit control section to control air conditioning operation, the indoor unit being communicable with the outdoor unit; and a remote controller communicable with the indoor unit. The remote controller includes: a schedule storage section to store information on an operation schedule of the air conditioner for each date and time set in advance, a reference temperature for determining an operation mode of the air conditioner, and an outside air temperature correction value for correcting the outside air temperature; and an operation mode determination section to select the operation mode from among cooling, blowing, and heating using the information on the operation schedule, a corrected outside air temperature obtained through correction of the outside air temperature with the outside air temperature correction value, and the reference temperature. The indoor unit control section controls the air conditioning operation using the reference temperature as a target temperature in the operation mode determined by the operation mode determination section.

Advantageous Effects of Invention

The air conditioning system according to the present invention has the effect of obtaining an air conditioner that can realize a user's comfort with a smaller number of setting operations.

BRIEF DESCRIPTION OF DRAWINGS

FIG. 7 is a flowchart explaining an outside air temperature schedule operation process of the air conditioning system according to the first embodiment of the present invention.

FIG. 8 is a flowchart explaining a process of determining an operation mode on the basis of the outside air temperature schedule and the outside air temperature by an operation mode determination section of the remote according to the first embodiment of the present invention.

DESCRIPTION OF EMBODIMENTS

Hereinafter, an air conditioning system according to embodiments of the present invention will be described in detail on the basis of the drawings. The present invention is not limited to the embodiments.

First Embodiment

Figure 1:
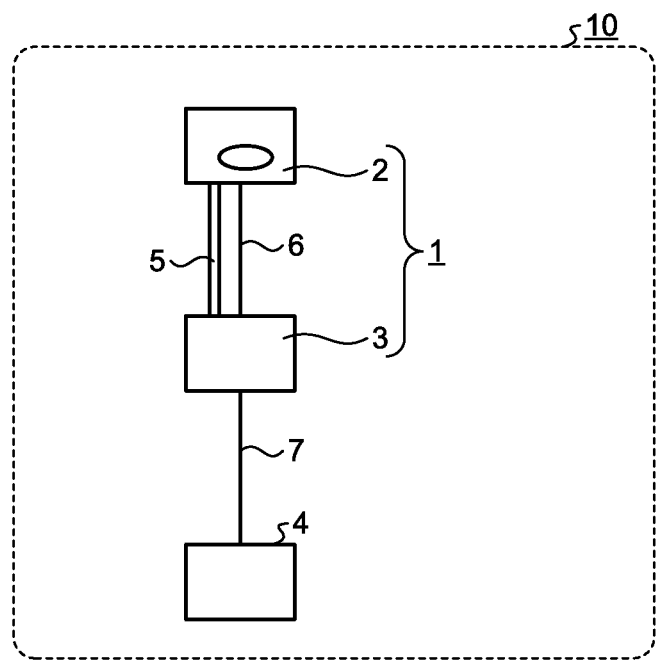
FIG. 1 is a schematic diagram illustrating the configuration of an air conditioning system according to a first embodiment of the present invention.
Figure 2:
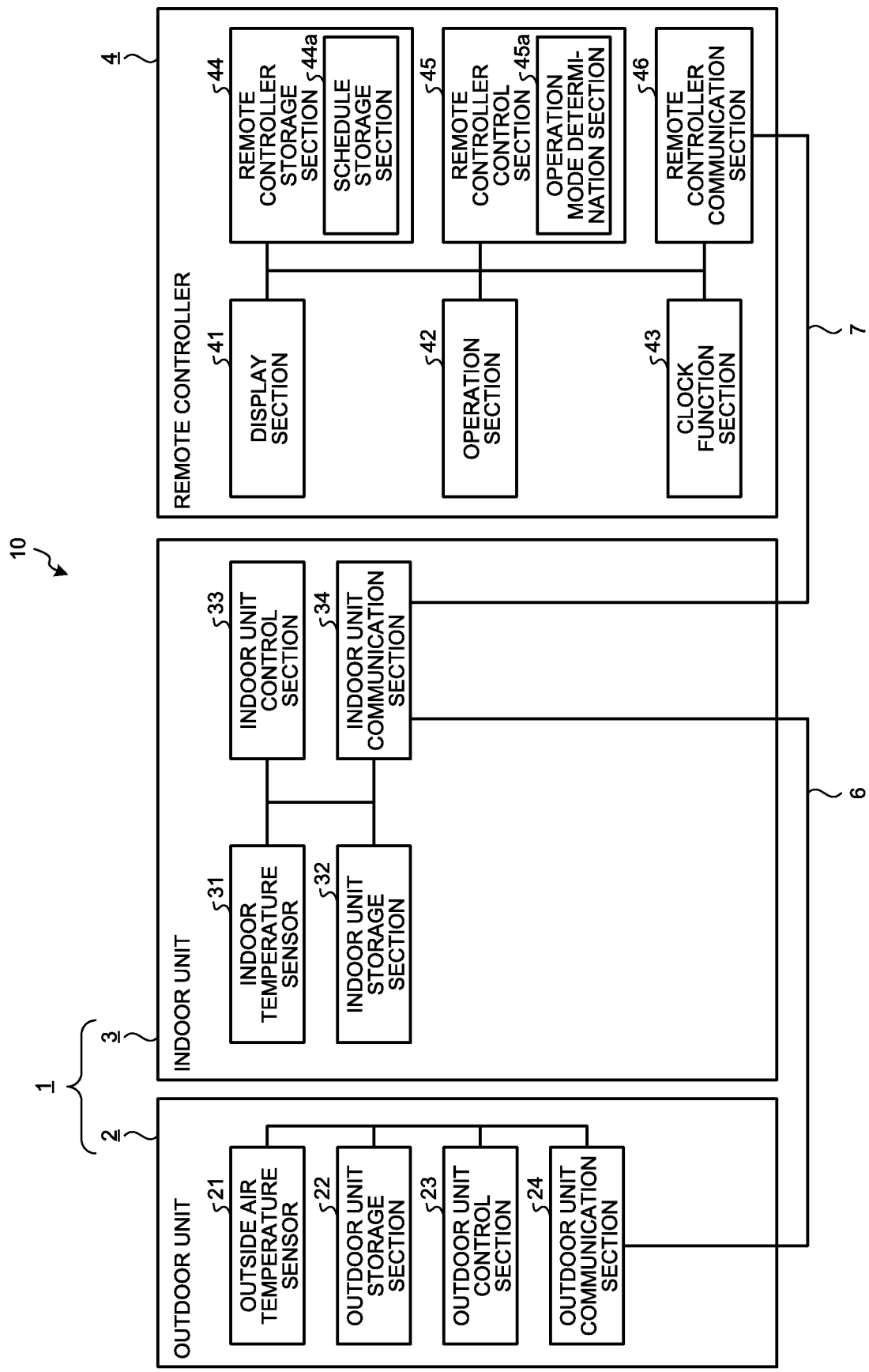
FIG. 2 is a functional block diagram of the main part of the air conditioning system according to the first embodiment of the present invention.

FIG. 1 is a schematic diagram illustrating the configuration of an air conditioning system 10 according to a first embodiment of the present invention. FIG. 2 is a functional block diagram of the main part of the air conditioning system 10 according to the first embodiment of the present invention. The air conditioning system 10 according to the first embodiment includes an air conditioner 1 and a remote controller 4. The air conditioner 1 includes an outdoor unit 2 arranged outdoors and an indoor unit 3 arranged indoors. The remote controller 4 remotely controls the operation of the air conditioner 1.

The outdoor unit 2 and the indoor unit 3 are connected by a refrigerant pipe 5 and an inside-outside communication line 6, and a refrigerant for heat exchange flows through the refrigerant pipe 5. The outdoor unit 2 and the indoor unit 3 constitute one complete refrigeration cycle of the air conditioner 1. The air conditioner 1 uses the refrigerant circulating between the outdoor unit 2 and the indoor unit 3 through the refrigerant pipe 5 to transfer heat between the air inside the room, i.e., an air conditioning target space, and the air outside the room, thereby realizing air conditioning for the room. In FIGS. 1 and 2, only the configuration of the main part of the air conditioning system 10 is illustrated, and various components such as a blower fan and a refrigeration cycle mechanism including a compressor are not illustrated.

The main configuration of the outdoor unit 2 includes an outside air temperature sensor 21, an outdoor unit storage section 22, an outdoor unit control section 23, and an outdoor unit communication section 24. The outside air temperature sensor 21 is an outside air temperature detection section that detects the outside air temperature. The outdoor unit storage section 22 stores various kinds of information necessary for air conditioning by the air conditioner 1. The outdoor unit control section 23 controls the operation of the outdoor unit 2 by controlling each component in the outdoor unit 2 in order for the air conditioner 1 to perform air conditioning. The outdoor unit communication section 24 transmits and receives information to and from the indoor unit 3. The components of the outdoor unit 2 can exchange information with one another.

The outside air temperature sensor 21 periodically transmits the detected outside air temperatures to the outdoor unit control section 23 at predetermined intervals. The outdoor unit control section 23 periodically transmits the outside air temperatures acquired from the outside air temperature sensor 21 to the indoor unit 3 at predetermined intervals via the outdoor unit communication section 24.

Figure 3:
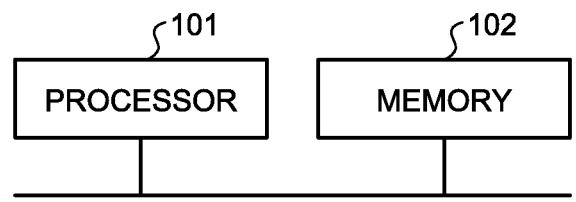
FIG. 3 is a diagram illustrating an exemplary hardware configuration of a processing circuit according to the first embodiment of the present invention.

The outdoor unit control section 23 is realized, for example, as a processing circuit in the hardware configuration illustrated in FIG. 3. FIG. 3 is a diagram illustrating an exemplary hardware configuration of the processing circuit according to the first embodiment of the present invention. In a case where each component that constitutes the outdoor unit control section 23 is realized by the processing circuit illustrated in FIG. 3, each component that constitutes the outdoor unit control section 23 is realized when a processor 101 executes a program stored in a memory 102. A plurality of processors and a plurality of memories may cooperate to realize the above functions. Part of the functions of the outdoor unit control section 23 may be implemented as an electronic circuit, and the other parts may be realized using the processor 101 and the memory 102. Similarly, the outdoor unit communication section 24 may be configured to be realized when the processor 101 executes a program stored in the memory 102. The processor and memory for realizing the outdoor unit communication section 24 may be the same as or different from the processor and memory for realizing the outdoor unit control section 23.

The main configuration of the indoor unit 3 includes an indoor temperature sensor 31, an indoor unit storage section 32, an indoor unit control section 33, and an indoor unit communication section 34. The indoor temperature sensor 31 is an indoor temperature detection section that detects the indoor temperature that is the temperature of a room equipped with the indoor unit 3. The indoor unit storage section 32 stores various kinds of information necessary for an air conditioning process performed by the air conditioner 1. The indoor unit control section 33 controls the operation of the indoor unit 3 by controlling each component in the indoor unit 3 in order for the air conditioner 1 to perform air conditioning. The indoor unit communication section 34 transmits and receives information to and from the remote 4.

The indoor unit control section 33 stores, in the indoor unit storage section 32, the outside air temperatures transmitted from the outdoor unit control section 23, and periodically transmits the outside air temperatures to the remote 4 via the indoor unit communication section 34 at predetermined intervals. The indoor unit control section 33 also performs outside air temperature schedule operation on the basis of the outside air temperature schedule operation command transmitted from the remote 4.

The outside air temperature schedule operation is schedule operation in which the outside air temperature is taken into consideration. Specifically, the operation is performed on the basis of the operation mode determined using the outside air temperature and a reference temperature as will be described later. The outside air temperature schedule is information on operation conditions set for performing the outside air temperature schedule operation. The outside air temperature schedule is used to generate the outside air temperature schedule operation command that instructs the indoor unit 3 to perform the outside air temperature schedule operation as will be described later. The outside air temperature schedule includes "days of the week", "time slots", "operation" or "shutdown", "operation mode selection", and "outside air temperature correction value".

In addition to the outside air temperature schedule operation, the indoor unit control section 33 can perform normal schedule operation. The normal schedule operation is schedule operation in which the operation is automatically controlled according to set temperature schedule information indicating the correspondence between set temperature and set time for each day of the week. The set temperature schedule information is stored in advance in the indoor unit storage section 32 through the operation of the remote 4. The normal schedule is operation conditions set for performing the normal schedule operation and is information indicating the correspondence between set temperature and set time for each day of the week.

The indoor unit communication section 34 can bidirectionally transmit and receive information to and from the outdoor unit communication section 24 of the outdoor unit 2 via the inside-outside communication line 6. The indoor unit communication section 34 can also bidirectionally transmit and receive information to and from the remote 4 via a remote controller communication line 7.

The indoor unit control section 33 is realized, for example, as a processing circuit in the hardware configuration illustrated in FIG. 3. In a case where each component that constitutes the indoor unit control section 33 is realized by the processing circuit illustrated in FIG. 3, each component that constitutes the indoor unit control section 33 is realized when the processor 101 executes a program stored in the memory 102. A plurality of processors and a plurality of memories may cooperate to realize the above functions. Part of the functions of the indoor unit control section 33 may be implemented as an electronic circuit, and the other parts may be realized using the processor 101 and the memory 102. Similarly, the indoor unit communication section 34 may be configured to be realized when the processor 101 executes a program stored in the memory 102. The processor and memory for realizing the indoor unit communication section 34 may be the same as or different from the processor and memory for realizing the indoor unit control section 33.

The remote 4 is an operation device having a clock function for setting the current day of the week and date and time, a function of setting information required for air conditioning by the air conditioner 1, and a function of displaying conditions. The information necessary for air conditioning by the air conditioner 1 includes a set temperature that serves as a target indoor temperature in air conditioning by the air conditioner 1, and an operation schedule. The remote 4 generates the outside air temperature schedule operation command, and transmits the outside air temperature schedule operation command to the indoor unit control section 33 of the indoor unit 3 to control the outside air temperature schedule operation.

The main configuration of the remote 4 includes a display section 41, an operation section 42, a clock function section 43, a remote controller storage section 44, a remote controller control section 45, and a remote controller communication section 46. The display section 41 displays various kinds of information. The operation section 42 accepts setting operations. The clock function section 43 has a clock function related to days of the week and date and time. The remote controller storage section 44 stores various kinds of information necessary for an air conditioning process performed by the air conditioner 1. The remote controller control section 45 controls the operation of the remote 4 and the operation of an outside air temperature schedule function. The remote controller communication section 46 transmits and receives information to and from the indoor unit communication section 34 of the indoor unit 3.

Figure 4:
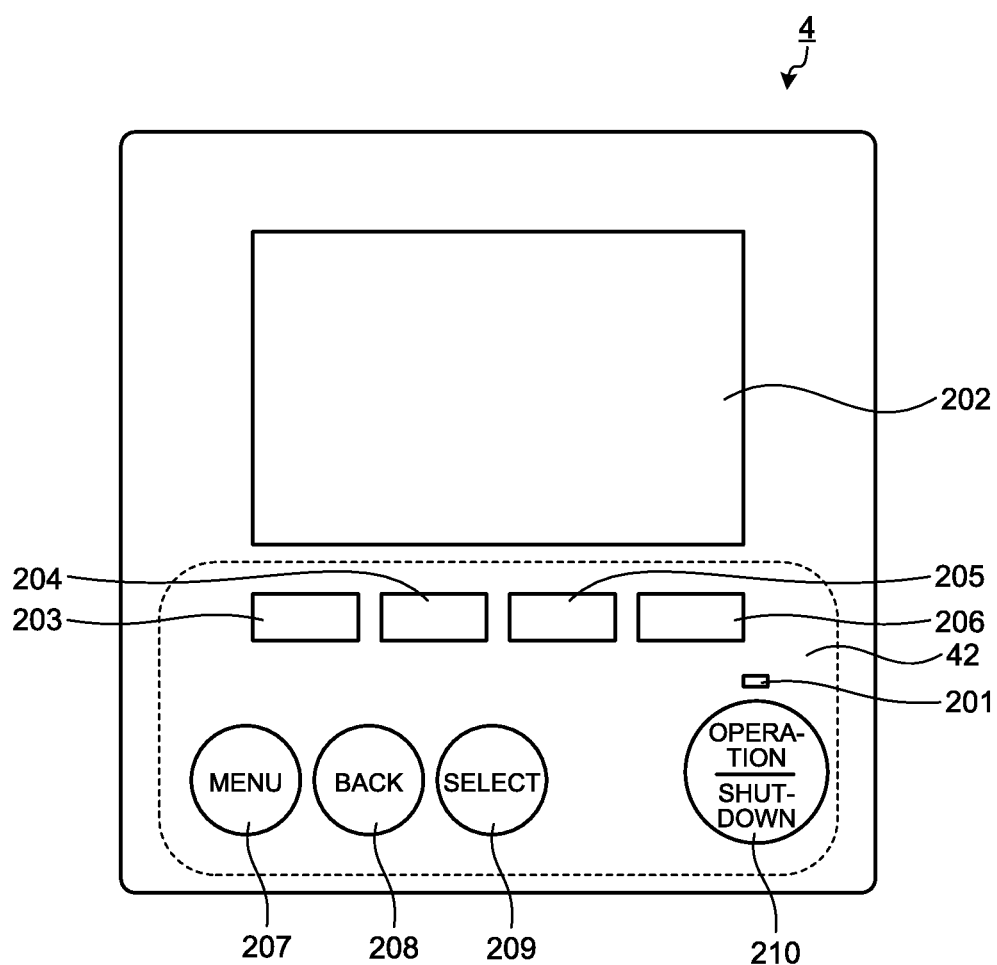
FIG. 4 is a front view illustrating a remote according to the first embodiment of the present invention.

FIG. 4 is a front view illustrating the remote 4 according to the first embodiment of the present invention. As illustrated in FIG. 4, the remote 4 includes an operation lamp 201 and a display 202 as the display section 41. The remote 4 also includes, as the operation section 42, function buttons 203, 204, 205, and 206, a menu button 207, a back button 208, a select button 209, and an operation/shutdown button 210.

The display section 41 displays information and conditions required for air conditioning by the air conditioner 1, such as the set temperature and operation mode of the air conditioner 1, and switches and displays the screen according to the operation on the operation section 42.

The operation lamp 201 is on while the air conditioner 1 is operated and off while the air conditioner 1 is not operated, thereby identifying the operation state of the air conditioner 1. To the function buttons 203, 204, 205, and 206, various functions such as switching the operation mode and changing the set temperature are assigned. The functions executed in response to the operation of the function buttons 203, 204, 205, and 206 depend on the content displayed on the display section 41. The menu button 207 is a button for displaying a menu screen (not illustrated) on the display 202. The menu screen is a screen that displays various menus such as a menu for changing the direction of wind, a menu for setting a timer, and a menu for setting a schedule, from among which any menu can be selected.

The back button 208 is a button for displaying the screen immediately before the screen currently displayed on the display 202. The select button 209 is a button for determining the content currently displayed on the display 202. The operation/shutdown button 210 is a button for switching between the operation and shutdown of the air conditioner 1.

Note that a configuration such as push buttons or a capacitive touch panel can be used for the function buttons 203, 204, 205, and 206, the menu button 207, the back button 208, the select button 209, and the operation/shutdown button 210.

Upon receiving the operation from a user, the operation section 42 outputs information corresponding to the operation of the user to the remote controller control section 45 as an operation signal.

The remote controller storage section 44 stores settings to be displayed on the display section 41 and image data associated with the settings on a temporary or long-term basis. The remote controller storage section 44 also includes a schedule storage section 44a that stores information on the outside air temperature schedule that is the operation schedule of the air conditioner 1 set for each date and time.

The remote controller control section 45 controls the display section 41 and the remote controller communication section 46 on the basis of the operation signal output from the operation section 42. The remote controller control section 45 also includes an operation mode determination section 45a that selects the operation mode from among cooling, blowing, and heating on the basis of information on the operation schedule and the outside air temperature as will be described later. The operation mode determination section 45a stores the outside air temperature transmitted from the indoor unit 3 in the schedule storage section 44a. As described above, since the outdoor unit 2 and the indoor unit 3 are connected by the inside-outside communication line 6 and the indoor unit 3 and the remote 4 are connected by the remote controller communication line 7, information on the outside air temperature detected by the outside air temperature sensor 21 can be not only used by the outdoor unit 2 but also shared with the indoor unit 3 and the remote 4.

The remote controller control section 45 is realized, for example, as a processing circuit in the hardware configuration illustrated in FIG. 3. In a case where each component that constitutes the remote controller control section 45 is realized by the processing circuit illustrated in FIG. 3, each component that constitutes the remote controller control section 45 is realized when the processor 101 executes a program stored in the memory 102. A plurality of processors and a plurality of memories may cooperate to realize the above functions. Part of the functions of the remote controller control section 45 may be implemented as an electronic circuit, and the other parts may be realized using the processor 101 and the memory 102. Similarly, the remote controller communication section 46 may be configured to be realized when the processor 101 executes a program stored in the memory 102. The processor and memory for realizing the remote controller communication section 46 may be the same as or different from the processor and memory for realizing the remote controller control section 45.

The remote controller communication section 46 can bidirectionally transmit and receive information to and from the indoor unit communication section 34 of the indoor unit 3 via the remote controller communication line 7. Alternatively, the remote controller communication section 46 may bidirectionally transmit and receive information to and from the indoor unit communication section 34 of the indoor unit 3 using wireless communication.

Figure 5:
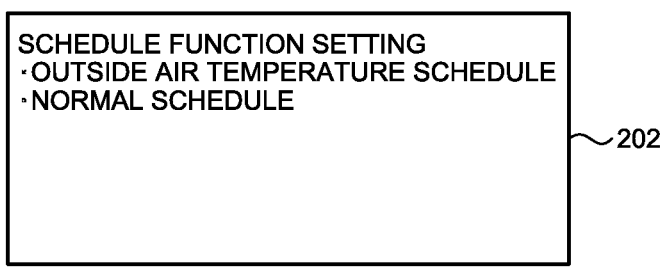
FIG. 5 is a diagram illustrating an exemplary screen displayed on a display of the remote according to the first embodiment of the present invention.

FIG. 5 is a diagram illustrating an exemplary screen displayed on the display 202 of the remote 4 according to the first embodiment of the present invention. The screen illustrated in FIG. 5 is an exemplary screen for enabling the user to set a schedule and has a screen configuration in which either the "outside air temperature schedule" or the "normal schedule" can be selected. The "normal schedule" is a schedule necessary for the normal schedule operation and indicates the correspondence between set temperature and set time for each day of the week. As described above, the remote 4 includes the various operation buttons as the operation section 42, and the user presses the operation buttons of the operation section 42 to set information on the schedule including days of the week, time slots, and operation/shutdown setting.

Figure 6:
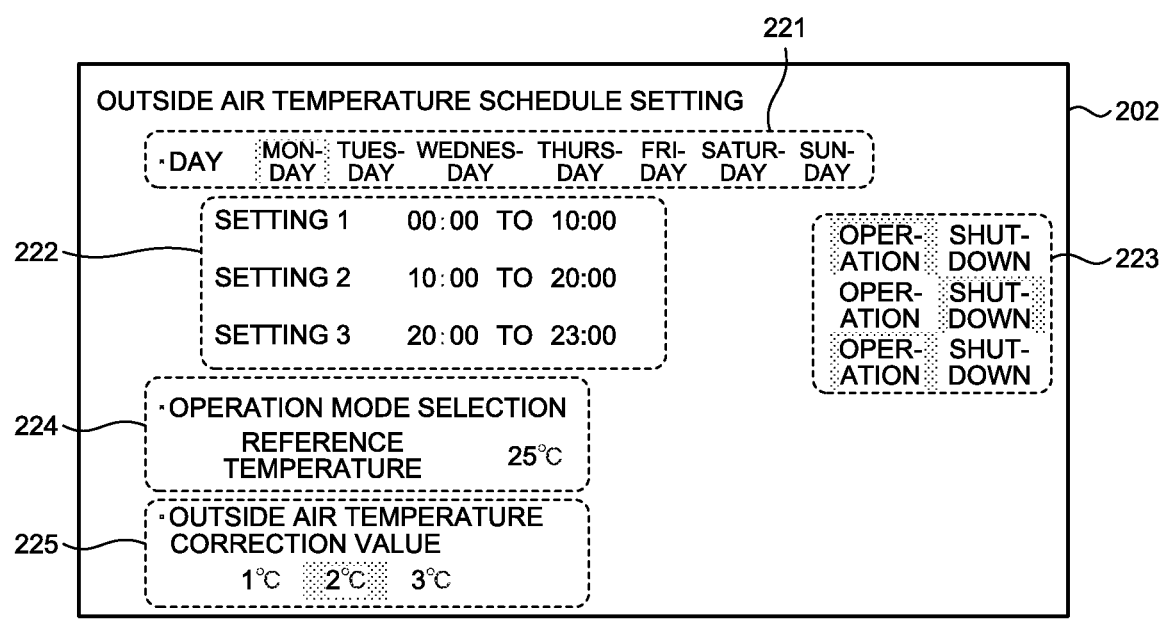
FIG. 6 is a diagram illustrating an exemplary screen for setting an outside air temperature schedule displayed on the display of the remote according to the first embodiment of the present invention.

FIG. 6 is a diagram illustrating an exemplary screen for setting the outside air temperature schedule displayed on the display 202 of the remote 4 according to the first embodiment of the present invention. The screen illustrated in FIG. 6 is displayed in response to the "outside air temperature schedule" being selected with the operation section 42 on the screen illustrated in FIG. 5, and referred to as an outside air temperature schedule setting screen for enabling the user to set details of the outside air temperature schedule. The screen configuration of the outside air temperature schedule setting screen is not limited to the screen illustrated in FIG. 6.

The outside air temperature schedule setting screen illustrated in FIG. 6 is a screen for setting, as setting data for each day of the week, information on the time slot and information on the "operation" or "shutdown" of the air conditioner 1 in association with each other. The set of setting data set in association with each other on the outside air temperature schedule setting screen is stored in the schedule storage section 44a as one setting pattern. The reference temperature and the outside air temperature correction value are also set on the outside air temperature schedule setting screen and stored in the schedule storage section 44a. As will be described later, the reference temperature serves as a reference for determining the operation mode that is the type of operation in the air conditioner 1, and the outside air temperature correction value is used for correcting the outside air temperature when the operation mode is determined using the outside air temperature.

On the outside air temperature schedule setting screen illustrated in FIG. 6, a freely-selected day of the week in which the outside air temperature schedule operation is performed is set in a day setting section 221. In the example of FIG. 6, the character "Monday" indicating the day of the week is shaded, indicating that Monday is selected.

On the outside air temperature schedule setting screen illustrated in FIG. 6, a freely-selected time slot during which the outside air temperature schedule operation is performed is set in a time slot setting section 222. In the example of FIG. 6, three time slots, i.e., setting 1, setting 2, and setting 3, can be set.

On the outside air temperature schedule setting screen illustrated in FIG. 6, the operation or shutdown of the air conditioner 1 is set for each of the three time slots that are setting 1, setting 2, and setting 3 in an operation/shutdown setting section 223. The operation in the outside air temperature schedule operation includes cooling operation, heating operation, and blowing operation. In the case of the cooling operation in the outside air temperature schedule operation, the indoor unit control section 33 of the indoor unit 3 controls the cooling operation of the air conditioner 1 such that the temperature approaches the reference temperature to be described later. In the case of the heating operation in the outside air temperature schedule operation, the indoor unit control section 33 of the indoor unit 3 controls the heating operation of the air conditioner 1 such that the temperature approaches the reference temperature to be described later. The "shutdown" as used herein means that the indoor unit control section 33 of the indoor unit 3 performs control to stop the operation of the air conditioner 1.

In the example of FIG. 6, the character "operation" is shaded, indicating that the operation of the air conditioner 1 is selected. The character "shutdown" is also shaded, indicating that the shutdown of the air conditioner 1 is selected. In FIG. 6, the "operation" is set in the time slot of setting 1, the "shutdown" is set in the time slot of setting 2, and the "operation" is set in the time slot of setting 3.

On the outside air temperature schedule setting screen illustrated in FIG. 6, the reference temperature serving as a reference for determining the operation mode, which is the type of operation in the air conditioner 1, is set in an operation mode selection section 224. A freely-selected preferred temperature that the user him/herself thinks is comfortable is set as the reference temperature. The example of FIG. 6 indicates that 25° C. is selected as the reference temperature.

On the outside air temperature schedule setting screen illustrated in FIG. 6, the outside air temperature correction value for correcting the outside air temperature, which is used when the operation mode is determined using the outside air temperature, is set in an outside air temperature correction section 225. A freely-selected preferred temperature that the user him/herself thinks is comfortable is set as the outside air temperature correction value. A high temperature is set as the outside air temperature correction value in a case where the user wishes to make the temperature much cooler or warmer than the reference temperature. On the screen illustrated in FIG. 6, the outside air temperature correction value can be selected from among three temperatures that are 1° C., 2° C., and 3° C. In the example of FIG. 6, the character "2° C." is shaded, indicating that "2° C." is selected as the outside air temperature correction value.

Therefore, the schedule setting data set by the user on the outside air temperature schedule setting screen includes the information on the "operation" or "shutdown" of the air conditioner 1, the information on the days of the week and time slots for executing the setting, the reference temperature, and the outside air temperature correction value.

Next, a description will be given of a process of executing the outside air temperature schedule operation using the outside air temperature schedule set in the remote 4 of the air conditioning system 10 according to the first embodiment. FIG. 7 is a flowchart explaining the outside air temperature schedule operation process of the air conditioning system 10 according to the first embodiment of the present invention. The process illustrated in FIG. 7 is performed when the outside air temperature schedule operation is selected by the remote 4.

First, in step S10, the operation mode determination section 45a of the remote 4 determines the operation mode on the basis of the outside air temperature schedule and the outside air temperature.

Next, in step S20, the operation mode determination section 45a transmits, to the indoor unit control section 33 of the indoor unit 3, the outside air temperature schedule operation command that includes information on the determined operation mode, reference temperature for use in determining the operation mode to be described later, and time slot.

Next, in step S30, the indoor unit control section 33 of the indoor unit 3 controls the operation on the basis of the information on the operation mode, reference temperature, and time slot included in the outside air temperature schedule operation command transmitted from the operation mode determination section 45a. In the case of the cooling operation, the indoor unit control section 33 of the indoor unit 3 controls the cooling operation of the air conditioner 1 such that the temperature approaches the reference temperature. In the case of the heating operation, the indoor unit control section 33 of the indoor unit 3 controls the heating operation of the air conditioner 1 such that the temperature approaches the reference temperature. To be specific, the reference temperature is temperature information for use in determining the operation mode and is a specified temperature with which the indoor unit control section 33 of the indoor unit 3 controls the outside air temperature schedule operation. Therefore, the indoor unit control section 33 controls the outside air temperature schedule operation using the reference temperature as a target temperature.

Next, a description will be given of the process of determining the operation mode on the basis of the outside air temperature schedule and the outside air temperature performed by the operation mode determination section 45a. FIG. 8 is a flowchart explaining the process of determining the operation mode on the basis of the outside air temperature schedule and the outside air temperature performed by the operation mode determination section 45a of the remote 4 according to the first embodiment of the present invention. The process illustrated in FIG. 8 is performed on the condition that the outside air temperature schedule operation is selected by the remote 4.

First, once the outside temperature schedule operation is selected by the user's operation of the operation section 42 of the remote 4, information indicating that the outside air temperature schedule operation has been selected is transmitted as the operation signal from the operation section 42 to the operation mode determination section 45a.

Upon receiving the information indicating that the outside air temperature schedule operation has been selected, the operation mode determination section 45a acquires information on the outside air temperature in step S110. As described above, since the outdoor unit 2 and the indoor unit 3 are connected by the inside-outside communication line 6 and the indoor unit 3 and the remote 4 are connected by the remote controller communication line 7, the information on the outside air temperature detected by the outside air temperature sensor 21 is also transmitted to the indoor unit 3 and the remote 4. Information communication is periodically performed between the outdoor unit 2 and the indoor unit 3, and information on the operation state of the air conditioner 1 is transmitted between the outdoor unit 2 and the indoor unit 3.

Regarding the information on the operation state of the air conditioner 1, various kinds of information on the current operation state such as information on the operation or shutdown, information on the operation mode, and information on the set temperature are transmitted between the outdoor unit 2 and the indoor unit 3. The outside air temperature information is also included in the information on the operation state. The information on the operation mode is information as to which of the cooling operation, heating operation, and blowing operation the current type of operation is. Therefore, the operation mode determination section 45a of the remote 4 can periodically acquire the information on the outside air temperature acquired by the outdoor unit 2.

Figure 9:
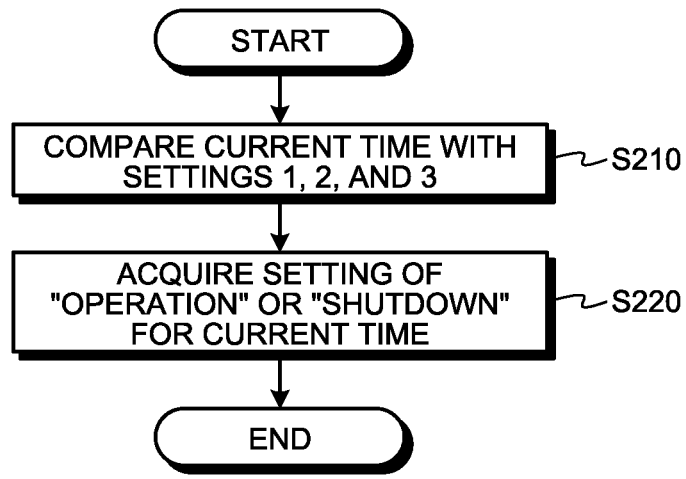
FIG. 9 is a flowchart explaining in detail an operation/shutdown determination process performed by the operation mode determination section of the air conditioning system according to the first embodiment of the present invention.

Next, in step S120, the operation mode determination section 45a executes an operation/shutdown determination process to determine whether the condition for the current time is a condition for selecting the operation according to the settings of the outside air temperature schedule. FIG. 9 is a flowchart explaining in detail the operation/shutdown determination process performed by the operation mode determination section 45a of the air conditioning system 10 according to the first embodiment of the present invention.

In step S210 of the operation/shutdown determination process, the operation mode determination section 45a compares the current time recognized by the clock function section 43 with the settings in the day setting section 221 and the settings of setting 1, setting 2, and setting 3 in the time slot setting section 222 of the outside air temperature schedule settings illustrated in FIG. 6. In step S220, the operation mode determination section 45a acquires the setting of the "operation" or "shutdown" for the current time from the settings of the outside air temperature schedule.

Specifically, the operation mode determination section 45a searches for the setting corresponding to the current day of the week and current time in the day setting section 221 and the time slot setting section 222 of the settings of the outside air temperature schedule illustrated in FIG. 6. For example, if the current time is 9:00 on Monday, the current time corresponds to "setting 1" in the time slot setting section 222 illustrated in FIG. 6. If the current time is 13:00 on Monday, the current time corresponds to "setting 2" in the time slot setting section 222 illustrated in FIG. 6. Then, the setting set in the operation/shutdown setting section 223 corresponding to the setting of interest is regarded as the setting of the "operation" or "shutdown" for the current time.

If the current time is 9:00 on Monday, the current time corresponds to "setting 1" in the time slot setting section 222, and the setting of the "operation" associated with "setting 1" is regarded as the operation/shutdown setting for the current time. Therefore, the operation mode determination section 45a determines to select the operation. If the current time is 13:00 on Monday, the current time corresponds to "setting 2" in the time slot setting section 222, and the setting of the "shutdown" associated with "setting 2" is regarded as the operation/shutdown setting for the current time. Therefore, the operation mode determination section 45a determines to select the shutdown. Consequently, it is determined in step S120 whether the condition for the current time is a condition for selecting the operation.

If the shutdown is selected, i.e., if No is determined in step S120, the operation mode determination section 45a ends the outside air temperature schedule operation process.

Figure 10:
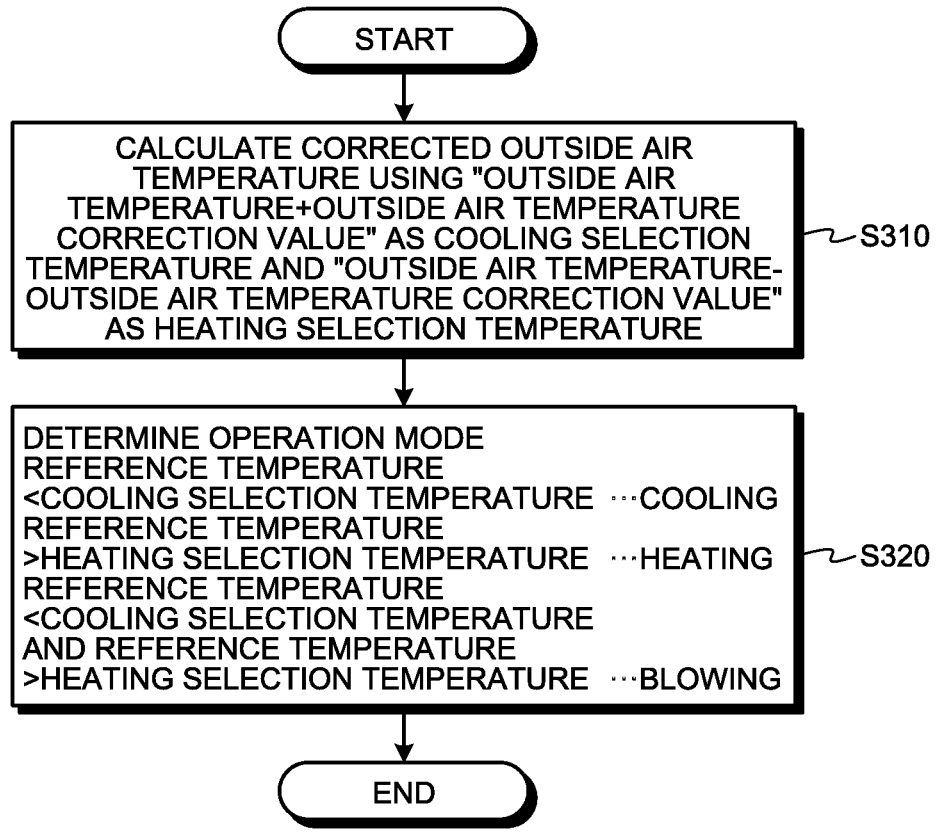
FIG. 10 is a flowchart explaining in detail an operation mode determination process performed by the remote of the air conditioning system according to the first embodiment of the present invention.

If the operation is selected, i.e., if Yes is determined in step S120, the operation mode determination section 45a performs an operation mode determination process in step S130. FIG. 10 is a flowchart explaining in detail the operation mode determination process performed by the remote 4 of the air conditioning system 10 according to the first embodiment of the present invention.

In step S310 of the operation mode determination process, the operation mode determination section 45a adds or subtracts the outside air temperature correction value set in the outside air temperature correction section 225 illustrated in FIG. 6 to or from the outside air temperature transmitted from the indoor unit 3 to calculate a corrected outside air temperature. Specifically, the operation mode determination section 45a adds the outside air temperature correction value to the outside air temperature using the calculation formula "outside air temperature+outside air temperature correction value" to calculate a cooling selection temperature that is the corrected outside air temperature for use in determining the operation mode. The cooling selection temperature is the corrected outside air temperature used to determine whether to perform the cooling operation. The operation mode determination section 45a subtracts the outside air temperature correction value from the outside air temperature using the calculation formula "outside air temperature−outside air temperature correction value" to calculate a heating selection temperature that is the corrected outside air temperature for use in determining the operation mode. The heating selection temperature is the corrected outside air temperature used to determine whether to perform the heating operation. For example, in a case where the operation mode determination section 45a acquires 22° C. as the outside air temperature from the indoor unit 3 and the setting of the outside air temperature correction value is 2° C., the cooling selection temperature is calculated to be 24° C. and the heating selection temperature is calculated to be 20° C.

Next, in step S320, the operation mode determination section 45a compares the cooling selection temperature and the heating selection temperature with the reference temperature set in the operation mode selection section 224 in FIG. 6, and selects the operation mode from among "cooling", "blowing", and "heating" according to the outside air temperature. When a first condition that "the reference temperature is lower than the cooling selection temperature" is satisfied, i.e., when the condition formula "reference temperature<cooling selection temperature" is satisfied, the operation mode determination section 45a selects "cooling" as the operation mode on the basis of the assumption that the temperature that the user wishes to feel is lower than the outside air temperature. Therefore, when "the reference temperature is equal to the cooling selection temperature", i.e., when the condition formula "reference temperature=the cooling selection temperature" is satisfied, "cooling" is not selected as the operation mode since the first condition is not satisfied.

When a second condition that "the reference temperature is higher than the heating selection temperature" is satisfied, i.e., when the condition formula "reference temperature>heating selection temperature" is satisfied, the operation mode determination section 45a selects "heating" as the operation mode on the basis of the assumption that the temperature that the user wishes to feel is higher than the outside air temperature. Therefore, when "the reference temperature is equal to the heating selection temperature", i.e., when the condition formula "reference temperature=the heating selection temperature" is satisfied, "heating" is not selected as the operation mode since the second condition is not satisfied.

When both of the first condition that "the reference temperature is lower than the cooling selection temperature" and the second condition that "the reference temperature is higher than the heating selection temperature" are satisfied, i.e., when both of the condition formulas "reference temperature<cooling selection temperature" and "reference temperature>heating selection temperature" are satisfied, the operation mode determination section 45a selects "blowing" as the operation mode.

Figure 11:
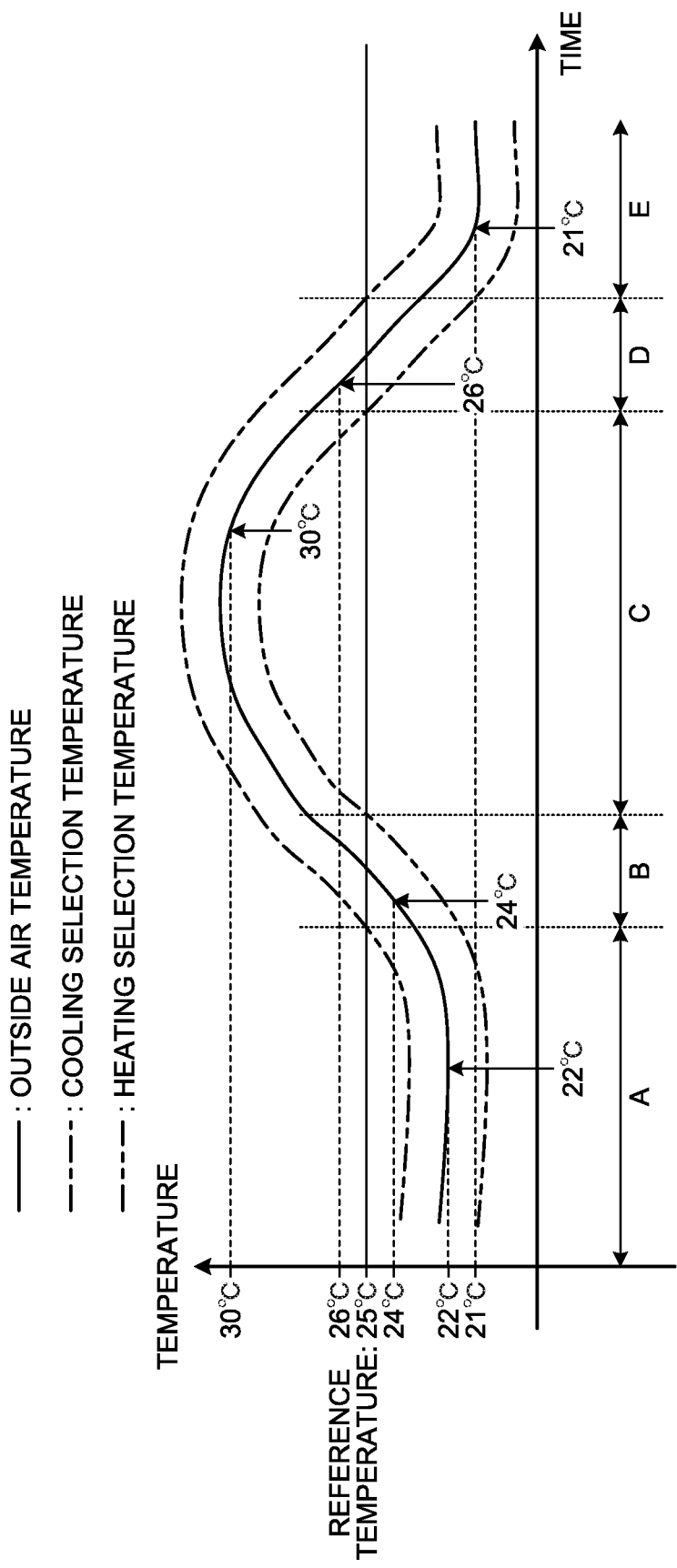
FIG. 11 is a conceptual diagram explaining an exemplary operation mode determination method in the remote of the air conditioning system according to the first embodiment of the present invention.

FIG. 11 is a conceptual diagram explaining an exemplary operation mode determination method in the remote of the air conditioning system according to the first embodiment of the present invention. In FIG. 11, the horizontal axis direction indicates time, and the vertical axis direction indicates temperature. In FIG. 11, the outside air temperature, the cooling selection temperature, and the heating selection temperature are illustrated. The following description is on the basis of the assumption that the reference temperature is 25° C. and the setting of the outside air temperature correction value is 2° C.

In the time slot A of FIG. 11 in which the outside air temperature is 22° C., the cooling selection temperature is calculated to be 24° C. and the heating selection temperature is calculated to be 20° C. In this case, the first condition is not met but the second condition is met, i.e., the condition formula "reference temperature>heating selection temperature" is satisfied. Therefore, "heating" is selected as the operation mode.

In the time slot B of FIG. 11 in which the outside air temperature is 24° C., the cooling selection temperature is calculated to be 26° C. and the heating selection temperature is calculated to be 22° C. In this case, the first condition and the second condition are met, i.e., both of the condition formulas "reference temperature<cooling selection temperature" and "reference temperature>heating selection temperature" are satisfied. Therefore, "blowing" is selected as the operation mode.

In the time slot C of FIG. 11 in which the outside air temperature is 30° C., the cooling selection temperature is calculated to be 32° C. and the heating selection temperature is calculated to be 28° C. In this case, the second condition is not met but the first condition is met, i.e., the condition formula "reference temperature<cooling selection temperature" is satisfied. Therefore, "cooling" is selected as the operation mode.

In the time slot D of FIG. 11 in which the outside air temperature is 26° C., the cooling selection temperature is calculated to be 28° C. and the heating selection temperature is calculated to be 24° C. In this case, the first condition and the second condition are met, i.e., both of the condition formulas "reference temperature<cooling selection temperature" and "reference temperature>heating selection temperature" are satisfied. Therefore, "blowing" is selected as the operation mode.

In the time slot E of FIG. 11 in which the outside air temperature is 21° C., the cooling selection temperature is calculated to be 23° C. and the heating selection temperature is calculated to be 19° C. In this case, the first condition is not met but the second condition is met, i.e., the condition formula "reference temperature>heating selection temperature" is satisfied. Therefore, "heating" is selected as the operation mode.

As described above, in step S320, by comparing the cooling selection temperature and the heating selection temperature with the reference temperature to determine the operation mode, it is possible to automatically control the operation of the air conditioner 1 using the operation schedule determined by reflecting in the outside air temperature the comfort that suits the user's preference such as a preference for a much cooler room or much warmer room, rather than control the operation of the air conditioner 1 using the operation mode determined merely on the basis of the outside air temperature.

In addition, in the air conditioning system 10, the outside air temperature schedule operation is automatically performed merely through the selection of the mode of the outside air temperature schedule operation by using the remote 4. As a result, the user does not need to operate the remote 4 in order to seek his/her comfort, i.e., does not need to reset the normal schedule function, and thus the frequency of operations by the user can be reduced.

In a case where an operation mode switching function of the air conditioner is used for the purpose of improving the efficiency of energy saving according to the outside air temperature, the operation mode that is determined by the air conditioner and that gives priority to the efficiency of energy saving does not necessarily coincide with the operation mode felt by the user. Therefore, the user may feel too hot or too cold, which impairs the user's comfort.

In a case where the operation mode switching function is used for the purpose of improving the efficiency of energy saving according to the outside air temperature, the comfort can be improved through the resetting of the operation mode switching function. However, the essence of the operation mode switching function having the purpose of improving the efficiency of energy saving according to the outside air temperature is, in one aspect, to reduce the frequency of operations by the user. In this regard, the operation mode switching function does not fulfill its purpose sufficiently in terms of the user's operability.

As described above, in the air conditioning system 10 according to the first embodiment, the outdoor unit 2 and the indoor unit 3 are configured to be communicable with each other and the indoor unit 3 and the remote 4 are configured to be communicable each other. Consequently, the operation mode determination section 45a of the remote 4 can acquire information on the outside air temperature detected by the outside air temperature sensor 21 of the outdoor unit 2 via the indoor unit 3. In addition, in the air conditioning system 10, the outside air temperature schedule can be set and stored in the schedule storage section 44a using the display section 41 and the operation section 42 of the remote 4. Then, in the air conditioning system 10, the operation mode determination section 45a compares the corrected outside air temperature obtained through the correction of the outside air temperature using the correction value that suits the user's preference with the reference temperature in the outside air temperature schedule setting, and determines the operation mode.

As a result, the air conditioning system 10 can automatically control the operation of the air conditioner 1 using the operation schedule determined by reflecting in the outside air temperature the comfort that suits the user's preference, rather than control the operation of the air conditioner 1 using the operation mode determined merely on the basis of the outside air temperature. Therefore, in the air conditioning system 10, as compared with the normal schedule operation function provided in a typical air conditioner, it is possible to perform the operation control more tailored to the comfort that suits the user's preference, enable the schedule function to be adapted for the comfort that the user wishes to feel, and execute the schedule operation in consideration of the user's comfort.

In addition, since the outside air temperature schedule is set in advance in the air conditioning system 10, the outside air temperature schedule operation is automatically performed merely through the selection of the mode of the outside air temperature schedule operation by using the remote 4. As a result, the user does not need to operate the remote 4 every time the user seeks his/her comfort, i.e., does not need to reset the normal schedule function or reset the operation mode switching function having the purpose of improving the efficiency of energy saving according to the outside air temperature, and the frequency of operations by the user can be reduced.

Second Embodiment

In a second embodiment, a description will be given of a case where the air conditioning system 10 additionally has the function of taking into consideration the installation environment for the outdoor unit 2. Assuming that the outdoor unit 2 is installed in the sun as an example of the installation environment for the outdoor unit 2, the outdoor unit 2 is affected by direct sunlight in summer. Therefore, it is expected that the outside air temperature detected by the outside air temperature sensor 21 is high in a case where the outdoor unit 2 is installed in the sun, as compared with a case where the outdoor unit 2 is installed on the ground. In contrast, assuming that the outdoor unit 2 is installed in the shade, the outdoor unit 2 is not affected by sunlight. Therefore, in a case where the outdoor unit 2 is installed in the shade, the outside air temperature detected by the outside air temperature sensor 21 may be lower than the outside air temperature felt by the user.

Therefore, in a case where the outside air temperature detected by the outside air temperature sensor 21 provided in the outdoor unit 2 is used for determining the operation mode, it is preferable to take into consideration the outdoor installation environment for the outdoor unit 2. The second embodiment describes such a function of taking into consideration the difference, i.e., the temperature difference between the outside air temperature actually felt by the user and the outside air temperature detected by the outside air temperature sensor 21 of the outdoor unit 2.

Figure 12:
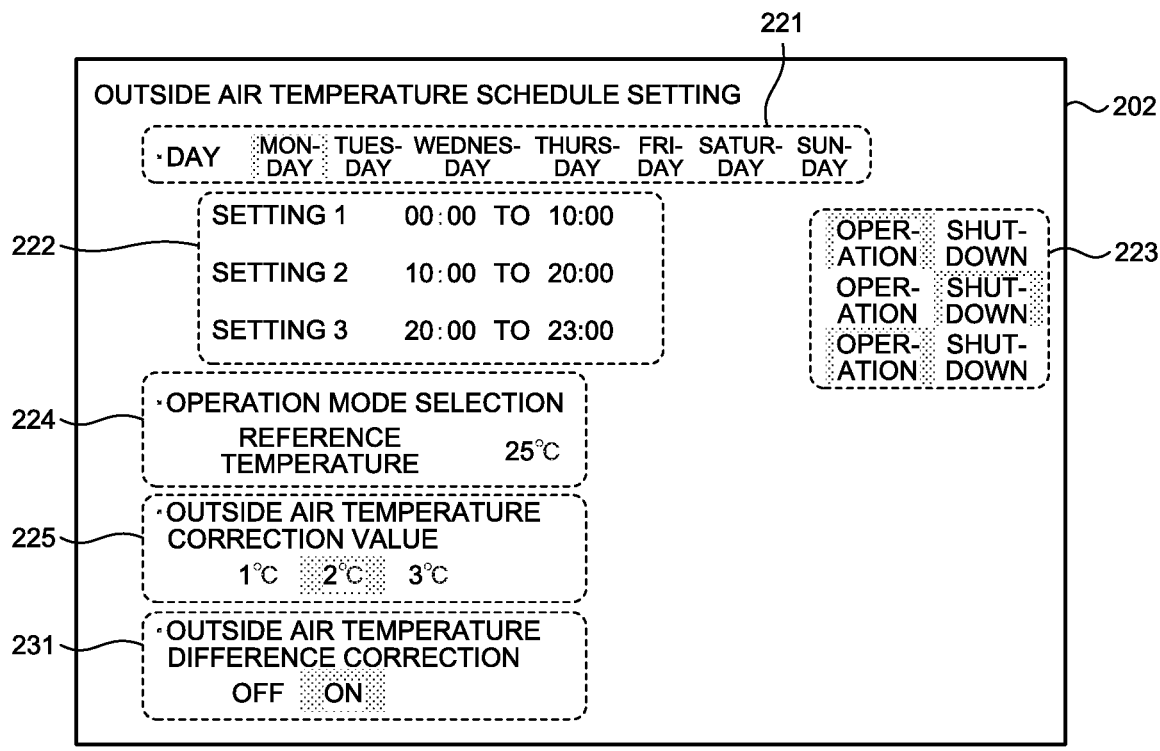
FIG. 12 is a diagram illustrating an exemplary screen for setting details of the outside air temperature schedule displayed on a display section in the remote according to a second embodiment of the present invention.

FIG. 12 is a diagram illustrating an exemplary screen for setting details of the outside air temperature schedule displayed on the display section 41 in the remote 4 according to the second embodiment of the present invention. The screen illustrated in FIG. 12 is displayed in response to the "outside air temperature schedule" being selected by the user on the screen illustrated in FIG. 5, and referred to as an outside air temperature schedule setting screen for enabling the user to set details of the outside air temperature schedule.

The screen illustrated in FIG. 12 is a combination of the screen configuration of the display 202 illustrated in FIG. 6 and an outside air temperature difference correction section 231. On the outside air temperature schedule setting screen illustrated in FIG. 12, the user can set, using the operation section 42 of the remote 4, whether to perform an outside air temperature difference correction. Specifically, in the second embodiment, the remote 4 additionally has an outside air temperature difference correction processing function for correcting the difference in the outside air temperature by taking into consideration the difference in the outside air temperature for the settings of the outside air temperature schedule.

Figure 13:
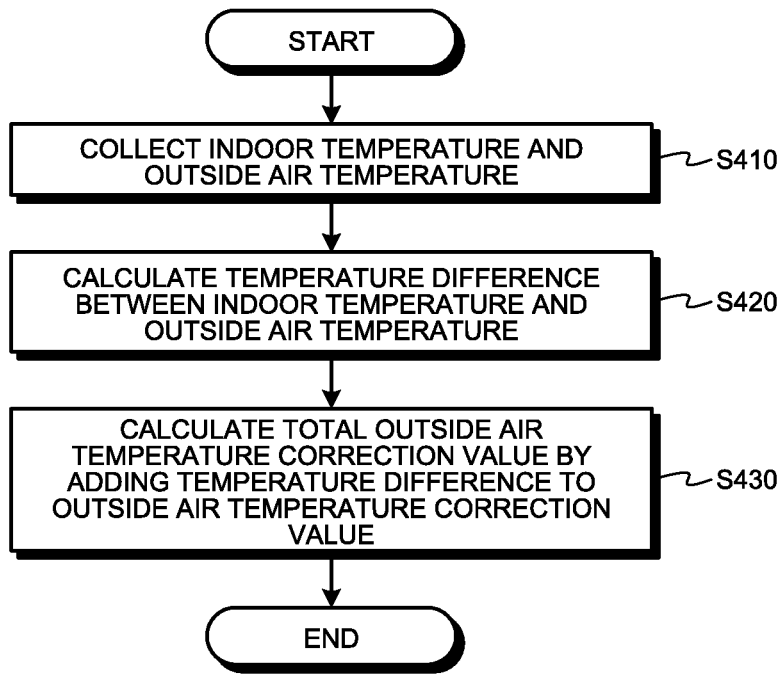
FIG. 13 is a flowchart explaining in detail an outside air temperature difference correction process performed by the operation mode determination section of the air conditioning system according to the second embodiment of the present invention.

FIG. 13 is a flowchart explaining in detail the outside air temperature difference correction process performed by the operation mode determination section 45a of the air conditioning system 10 according to the second embodiment of the present invention. In order to calculate the difference between the actual outside air temperature felt by the user and the outside air temperature detected by the outside air temperature sensor 21 of the outdoor unit 2, the operation mode determination section 45a collects in step S410 the indoor temperature detected by the indoor temperature sensor 31 of the indoor unit 3 and the outside air temperature detected by the outside air temperature sensor 21 of the outdoor unit 2. The indoor unit 3 and the remote 4 are connected by the remote controller communication line 7, and information on the operation state that is communicated between the indoor unit 3 and the remote 4 includes the indoor temperature and the outside air temperature. The operation mode determination section 45a stores, in the schedule storage section 44a, the indoor temperature and the outside air temperature acquired through the communication with the indoor unit 3. For example, the indoor temperature and the outside air temperature can be collected at any timing during the "shutdown" set in the settings of the outside air temperature schedule. Note that the timing of collecting the indoor temperature and the outside air temperature is not limited to this example, and it is possible to set the timing according to the operation conditions for the air conditioner 1.

Next, in step S420, the operation mode determination section 45a executes a process of calculating the difference between the indoor temperature and the outside air temperature. Specifically, the operation mode determination section 45a calculates the temperature difference, which is the difference between the indoor temperature and the outside air temperature, using the calculation formula "indoor temperature-outside air temperature". It is usually assumed here that the indoor temperature and the outside air temperature are the same. The above calculation formula is an example, and the calculation formula "indoor temperature-outside air temperature" for calculating the temperature difference can be changed as appropriate to an appropriate calculation formula according to the method of acquiring the indoor temperature and the outside air temperature by the air conditioner 1.

Next, in step S430, the operation mode determination section 45a calculates the total outside air temperature correction value by adding the calculated temperature difference between the indoor temperature and the outside air temperature to the outside air temperature correction value. In a case where the outdoor unit 2 is installed in the shade, the indoor temperature is 20° C., and the outside air temperature detected by the outside air temperature sensor 21 provided in the outdoor unit 2 is 17° C., then the temperature difference between the indoor temperature and the outside air temperature is calculated to be +3° C., and the total outside air temperature correction value for the case where the outside air temperature correction value is set to 2° C. is calculated to be 5° C. In a case where the outdoor unit 2 is installed in the sun, the indoor temperature is 20° C., and the outside air temperature detected by the outside air tempera-ture sensor 21 provided in the outdoor unit 2 is 25° C., then the temperature difference between the indoor temperature and the outside air temperature is calculated to be −5° C., and the total outside air temperature correction value for the case where the outside air temperature correction value is set to 2° C. is calculated to be −3° C.

The operation mode determination section 45a then uses the total outside air temperature correction value in the operation mode determination process described in the first embodiment, instead of the outside air temperature correction value. Consequently, the operation mode determination section 45a can correct the difference between the outside air temperature actually felt by the user and the outside air temperature detected by the outside air temperature sensor 21 of the outdoor unit 2 in consideration of the outdoor installation environment for the outdoor unit 2 to determine the operation mode.

As described above, since the remote 4 has the function of enabling the user to set the process of correcting the outside air temperature difference, it is possible to correct the outside air temperature difference by the remote 4, take into consideration the outdoor installation environment for the outdoor unit 2 in the operation mode determination process, correct the difference between the outside air temperature actually felt by the user and the outside air temperature detected by the outside air temperature sensor 21 of the outdoor unit 2, and determine the operation mode.

The configuration described in the above-mentioned embodiments indicates an example of the content of the present invention. The configuration can be combined with another well-known technique, and part of the configuration can be omitted or changed in a range not departing from the gist of the present invention.

REFERENCE SIGNS LIST 1 air conditioner; 2 outdoor unit; 3 indoor unit; 4 remote controller; 5 refrigerant pipe; 6 inside-outside communication line; 7 remote controller communication line; 10 air conditioning system; 21 outside air temperature sensor; 22 outdoor unit storage section; 23 outdoor unit control section; 24 outdoor unit communication section; 31 indoor temperature sensor; 32 indoor unit storage section; 33 indoor unit control section; 34 indoor unit communication section; 41 display section; 42 operation section; 43 clock function section; remote controller storage section; 44a schedule storage section; 45 remote controller control section; 45a operation mode determination section; 46 remote controller communication section; 101 processor; 102 memory; 201 operation lamp; 202 display; 203, 204, 205, 206 function button; 207 menu button; 208 back button; 209 select button; 210 operation/shutdown button; 221 day setting section; 222 time slot setting section; 223 operation/shutdown setting section; 224 operation mode selection section; 225 outside air temperature correction section; 231 outside air temperature difference correction section.

The invention claimed is:
1. An air conditioning system comprising:
an air conditioner that includes an outdoor unit including an outside air temperature sensor to detect an outside air temperature and an indoor unit including an indoor unit controller to control air conditioning operation, the indoor unit being communicable with the outdoor unit; and
a remote controller communicable with the indoor unit, wherein
the remote controller includes:

a schedule storage to store information on an operation schedule of the air conditioner for each date and time set in advance, a reference temperature for determining an operation mode of the air conditioner, and an outside air temperature correction value for correcting the outside air temperature; and an operation mode determiner to select the operation mode from among cooling, blowing, and heating using the information on the operation schedule, a corrected outside air temperature obtained through correction of the outside air temperature with the outside air temperature correction value, and the reference temperature, the indoor unit controller controls the air conditioning operation using the reference temperature as a target temperature in the operation mode determined by the operation mode determiner, and the operation mode determiner is configured to:

calculate a cooling selection temperature that is the corrected outside air temperature for selecting the cooling as the operation mode by adding the outside air temperature correction value to the outside air temperature and a heating selection temperature that is the corrected outside air temperature for selecting the heating as the operation mode by subtracting the outside air temperature correction value from the outside air temperature;

determine that a first condition is satisfied when the reference temperature is lower than the cooling selection temperature;

determine that a second condition is satisfied when the reference temperature is higher than the heating selection temperature;

select the cooling as the operation mode when the reference temperature satisfies the first condition but does not satisfy the second condition;

select the heating as the operation mode when the reference temperature satisfies the second condition but does not satisfy the first condition; and select the blowing as the operation mode when the reference temperature satisfies the first condition and the second condition.

2. The air conditioning system according to claim 1, wherein the indoor unit includes an indoor temperature sensor to detect an indoor temperature, and the operation mode determiner determines the operation mode using the information on the operation schedule, the corrected outside air temperature, a temperature difference between the outside air temperature and the indoor temperature, and the reference temperature.

3. The air conditioning system according to claim 1, wherein:

the remote controller further includes a display configured to display information and conditions required for air conditioning by the air conditioner, and the remote controller is formed to be a single device.

4. The air conditioning system according to claim 1, wherein:

the remote controller further includes an operation circuit configured to accept setting operations from a user, and the remote controller is formed to be a single device.

5. The air conditioning system according to claim 4, wherein:

the operation circuit further includes one or more operation buttons configured to be pressed by a user to set operational information for the air conditioning system.

6. The air conditioning system according to claim 1, wherein:

the remote controller further includes a clock function circuit configured to identify at least one of a current day of the week, a current date, and a current time, and the remote controller is formed to be a single device.

7. The air conditioning system according to claim 1, wherein:

the cooling selection temperature is set to be equal to the outside air temperature plus the outside aft temperature correction value; and the heating selection temperature is set to be equal to the outside air temperature minus the outside air temperature correction value.

8. The air conditioning system according to claim 1, wherein:

the indoor unit further includes an indoor temperature sensor to detect an indoor temperature;

the operation mode determiner is further configured to calculate a temperature difference by subtracting the outside air temperature from the indoor temperature;

the cooling selection temperature is set to be equal to the outside air temperature plus the sum of the outside air temperature correction value and the temperature difference; and the heating selection temperature is set to be equal to the outside air temperature minus the sum of the outside air temperature correction value and the temperature difference.

* * * * *